UNITED STATES PATENT OFFICE.

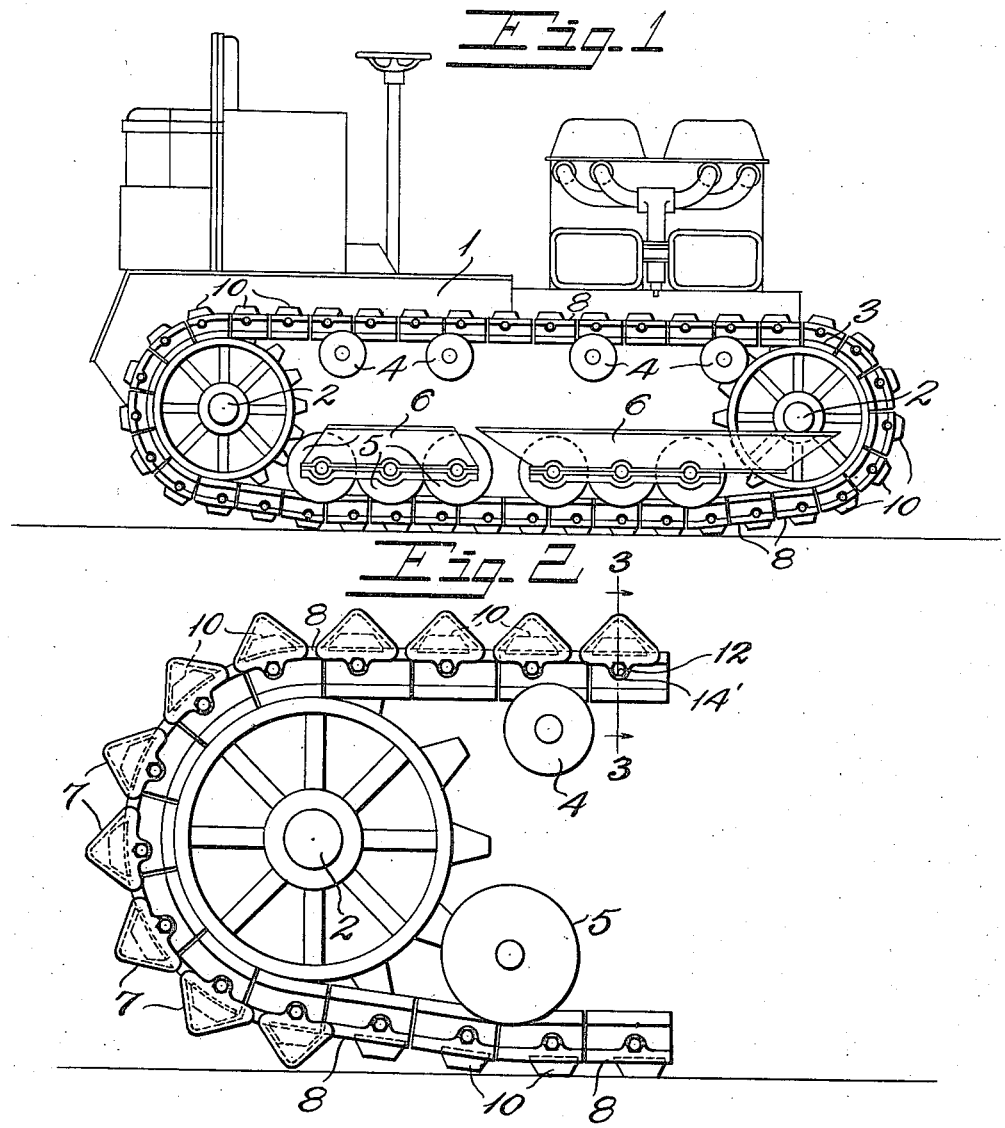

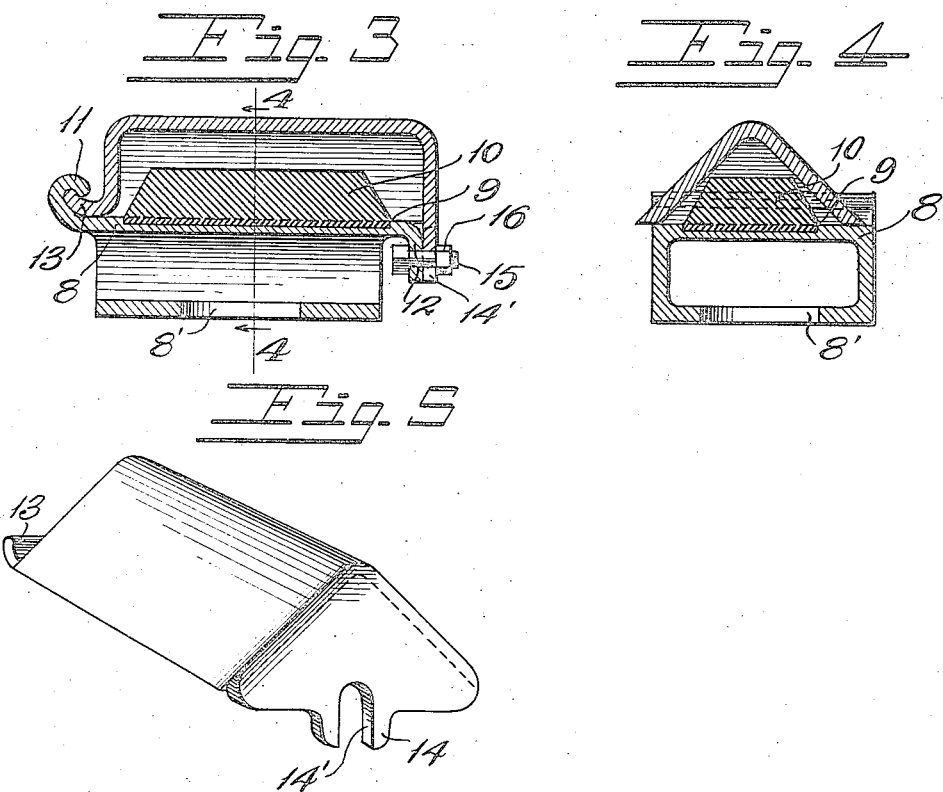

JOSEPH I. McMULLEN, OF WASHINGTON, DISTRICT OF COLUMBIA.

TRACTOR.

1,421,270. Specification of Letters Patent. Patented June 27, 1922.

Application filed July 9, 1920. Serial No. 394,994.

*To all whom it may concern:*

Be it known that I, JOSEPH I. McMULLEN, a citizen of the United States, residing at Washington, District of Columbia, have invented certain new and useful Improvements in Tractors, of which the following is a specification.

This invention relates to certain new and useful improvements in the construction of endless self laying tracks or what are usually denominated portable tracks for tractors.

Such tracks consist of a series of links or plates linked together and the present invention relates to the construction of the plate and more particularly to that part thereof known as the link or tread element.

In the use of wheels for vehicles, the area of the traction is the tangential contact between that part of the tire touching the roadway multiplied by its width, somewhat lessened by the inequalities of the surface of the roadway. In the case of a vehicle provided with a portable track, however, the area of contact is multiplied many times for each tread element is not only wider than the tire, but much greater in length and a number of the treads are in contact with the surface at the same moment; they hold with a firm and strong frictional grip and the tractor is capable of drawing behind it enormous loads. One of the ordinary sized military tractors such as used in the army at the present day can traverse a good roadway where there is not a steep gradient and drag behind it cars carrying as much as 50 tons of gravel.

Owing to the war and the conditions arising therefrom, the railways of the country, as carriers of freight, find it impossible to meet the demands made upon them and their equipment at present is totally inadequate to the service they are called upon to perform. It becomes increasingly evident therefore that the highways of travel must bear loads of freight far beyond that heretofore carried by them.

Referring to the second paragraph hereof, it is to be noted that while the tractors are capable of carrying great loads and readily carry them, the heavy metallic plates forming the track, as at present constructed, will greatly damage the surface of the roadways. If, then, the tractor is to play the important part in the transportation of freight which it seems apparent it must do in order to supplement the work of the railroads, it becomes highly important that some means be devised whereby the plates will be so constructed as to do no damage to the roadway.

Further, these metallic plates are and must be adapted to use mud dogs or grousers, which are fastened thereto when the tractor is used upon uneven surfaces, as in cross country work, or when the work to be done is in muddy fields, etc., and provision must be made for them, as the supplementary aid which they furnish under such circumstances is all important.

The object I have in view therefore is to construct a metal plate of which the grousers may be considered a part, in such a manner that when traversing good roads, the grouser can be readily detached; the plate itself, however, to be provided with a resilient rubber pad with a hard rubber base vulcanized directly upon the metal, in such manner that under ordinary circumstances the resilient rubber pad will be the only part which comes in direct contact with the surface of the roadway.

With these and other objects in view which are incident to the improvements, my invention consists in the parts and combinations to be hereinafter set forth and claimed, with the understanding that the several necessary elements comprising my invention may be varied in proportion and arrangement without departing from the spirit and scope of the appended claims.

In order to make my invention more clearly understood, I have shown in the accompanying drawings means for carrying it into practical effect, without limiting the improvements in their useful application to the particular construction, which for the purpose of explanation has been made the subject of illustration.

In the drawings—

Figure 1 is a conventional side elevation of an ordinary tractor, the endless track of which is equipped for travelling on smooth roads.

Fig. 2 is an enlarged detail view of a portion of the endless track seen in Fig. 1 equipped with metallic grousers for travelling over uneven surfaces or muddy roads.

Fig. 3 is a longitudinal sectional view on the line 3—3 of Fig. 2.

Fig. 4 is a transverse sectional view on the line 4—4 of Fig. 3.

Fig. 5 is a perspective view of the metallic grouser forming part of my invention.

The numeral 1 designates a tractor provided with tractor wheels 2 over which, as also over the idler wheels 4, travels an endless self laying or portable track 3; the track passes also under the wheels 5 of the load supporting trucks 6. It will be observed that that part of the series of links or plates constituting the track touching the ground and acting as a tread element is flat, so as to avoid damage to the surface of the roadway with which it comes in contact.

Referring now to Fig. 2, it will be noted that while some of the tread elements are of the same construction as those shown in Fig. 1, many of them are provided with mud dogs or grousers 7 the object of which is to bear sharply against and secure a firm contact with the ground. These are found necessary where the roadway is uneven or muddy or when the tractors are travelling across country but their proper purpose is strictly limited to such use, as on smooth roadways the grousers would impair the surface, and a number of tractors equipped with grousers passing over such a highway would seriously damage it. The construction of the grouser shown in Fig. 2 is more clearly illustrated in Figs. 3 and 4. The grouser is of triangular configuration in cross-section and that part of the plate 8 which travels closest to the ground and over which the grouser fits is provided with a hard rubber base 9 with a soft and resilient tread 10. The hard rubber base 9 is vulcanized directly to the metal of the plate. One end of the plate is provided with upturned lip 11, and the other with a depending lip 12. Referring particularly to Fig. 4, it will be observed that one side 8′ is open and it is this portion of the plate that fits over tractor wheels 2 which operate as sprockets.

The general shape of this form of grouser is shown more clearly, perhaps in the perspective view, Fig. 5. It is of a triangular configuration in cross section, one end having an upturned lip 13 and the other end terminating in a dependable member 14 provided with a slot 14′ adapted to fit over the bolt 15 extending from the rectangular plate, (see Fig. 3) the outer end of the bolt being screw threaded and having thereon a nut 16 in order to draw the grouser into firm attachment with the plate upon which the pad is mounted. By loosening the nut and lifting the grouser at that end to a nearly vertical position, it readily permits of the disconnection of engaging lip 11 of the plate from the upturned lip 13 of the grouser and the grouser is easily removed, leaving the soft rubber tread to bear against the ground.

It is apparent that other modifications may be made in the design of the structure shown by those skilled in the art without departing from the spirit thereof, and I desire, therefore, that my invention be limited only as set forth in the appended claims or by the showing of the prior art.

I claim:

1. A link for endless tracks comprising a metallic plate, a rubber pad permanently fastened thereon and a detachable grouser fitting over the pad, said rubber pad forming a tread surface when the grouser is removed.

2. A link for endless tracks comprising a metallic plate, a rubber surface therefor and permanently fastened thereon and a detachable grouser fitting over the rubber surface, said rubber surface forming a tread surface when the grouser is removed.

3. A link for endless tracks comprising a metallic plate, a soft rubber pad permanently fastened thereon, and a detachable grouser, said rubber pad forming a tread surface when the grouser is removed.

4. A link for endless tracks comprising a metallic plate of substantially rectangular cross-section, an upturned lip on one side of the plate, a downturned lip on the other side of the plate, a bolt extending through downturned lip, a grouser substantially of triangular cross-section, an upturned lip on one side of the grouser, a downwardly projecting portion on the other side of the grouser adapted to fit over the bolt and means to hold the grouser and plate together.

5. A link for endless tracks comprising a metallic plate of substantially rectangular cross-section, a rubber pad thereon, and a detachable grouser of substantially triangular cross-section adapted to fit over the pad in such manner that its peak comes in contact with the ground.

6. A link for endless tracks comprising a metallic plate, an upturned lip on one side of the plate, a rubber surface on the plate, a grouser fitting over the rubber surface, an upturned lip on one side of the grouser and means to hold the upturned lips of the grouser and plate in locked position.

7. A link for endless tracks comprising a metallic plate of substantially rectangular cross-section, a rubber surface on the plate, an upturned lip on one side of the plate, a down-turned lip on the other side of the plate, a bolt extending through the down-turned lip, a grouser substantially of triangular cross-section and fitting over the rubber surface, an up-turned lip on one side of the grouser, a downwardly projecting portion on the other side of the grouser adapted to fit over the bolt and means to hold the grouser and plate together.

8. A link for endless tracks comprising a metallic plate, an upturned lip on one side of the plate, a downturned lip on the other side of the plate, a grouser, an upturned lip on one side of the grouser, a downwardly projecting portion on the other side of the grouser and means to hold the grouser and plate together.

In testimony whereof I affix my signature.

JOSEPH I. McMULLEN.